(12) United States Patent
Kliger et al.

(10) Patent No.: US 8,611,327 B2
(45) Date of Patent: Dec. 17, 2013

(54) METHOD AND APPARATUS FOR POLICING A QOS FLOW IN A MOCA 2.0 NETWORK

(75) Inventors: Avi Kliger, Ramat Gan (IL); Yitshak Ohana, Givat Zeev (IL); Philippe Klein, Jerusalem (IL)

(73) Assignee: Broadcom Corporation, Irvine, CA (US)

( * ) Notice: Subject to any disclaimer, the term of this patent is extended or adjusted under 35 U.S.C. 154(b) by 283 days.

(21) Appl. No.: 13/031,688

(22) Filed: Feb. 22, 2011

(65) Prior Publication Data

US 2011/0205891 A1 Aug. 25, 2011

Related U.S. Application Data

(60) Provisional application No. 61/306,623, filed on Feb. 22, 2010.

(51) Int. Cl.
*H04B 7/212* (2006.01)

(52) U.S. Cl.
USPC ............ 370/348; 370/230; 370/232; 370/235; 370/236; 370/255; 370/278; 370/282; 370/329; 370/332

(58) Field of Classification Search
USPC ......... 370/230, 232, 235, 236, 255, 278, 282, 370/329, 332, 348
See application file for complete search history.

(56) References Cited

U.S. PATENT DOCUMENTS

| | | | |
|---|---|---|---|
| 3,836,888 | A | 9/1974 | Boenke et al. |
| 4,413,229 | A | 11/1983 | Grant |
| 4,536,875 | A | 8/1985 | Kume et al. |
| 4,608,685 | A | 8/1986 | Jain et al. |
| 4,893,326 | A | 1/1990 | Duran et al. |
| 5,052,029 | A | 9/1991 | James et al. |

(Continued)

FOREIGN PATENT DOCUMENTS

| | | |
|---|---|---|
| CN | 1422043 | 6/2003 |
| CN | 1588827 | 8/2004 |

(Continued)

OTHER PUBLICATIONS

International Search Report for International Application No. PCT/US03/27253 dated Dec. 30, 2003 (4 pgs).

(Continued)

*Primary Examiner* — Benjamin H Elliott, IV
(74) *Attorney, Agent, or Firm* — McDermott Will & Emery LLP

(57) ABSTRACT

Systems and methods for policing a Quality of Service (QoS) flow in a MoCA network are provided. The network may include a sending node, a receiving node and a network controller. The network controller may allocate a QoS flow between the sending node and the receiving node. The sending node may request bandwidth for the QoS flow from the network controller. QoS requests have a higher priority than some other requests and may swamp the network. The sending node therefore polices its use of the network. First, the sending node computes a policing time period Tpp. Next the sending node computes a packet and bit allocation for the use of the network during a Tpp. Last the sending node sends reservation requests to the network controller when the allocation of packet or bits has not been exceeded. If any allocation has been exceeded the sending node reserves bandwidth via opportunistic reservation requests which have a lower priority than some other requests.

30 Claims, 4 Drawing Sheets

(56) References Cited

U.S. PATENT DOCUMENTS

| | | |
|---|---|---|
| 5,170,415 A | 12/1992 | Yoshida et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,638,374 A | 6/1997 | Heath |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford, Jr. et al. |
| 6,118,762 A | 9/2000 | Nomura et al. |
| 6,157,645 A | 12/2000 | Shobatake |
| 6,167,120 A | 12/2000 | Kikinis |
| 6,192,070 B1 | 2/2001 | Poon et al. |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,434,151 B1 | 8/2002 | Caves et al. |
| 6,466,651 B1 | 10/2002 | Dailey |
| 6,481,013 B1 | 11/2002 | Dinwiddie et al. |
| 6,526,070 B1 | 2/2003 | Bernath et al. |
| 6,553,568 B1 | 4/2003 | Fijolek et al. |
| 6,563,829 B1 | 5/2003 | Lyles et al. |
| 6,567,654 B1 | 5/2003 | Coronel Arredondo et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,785,296 B1 | 8/2004 | Bell |
| 6,816,500 B1 | 11/2004 | Mannette et al. |
| 6,831,899 B1 | 12/2004 | Roy |
| 6,836,515 B1 | 12/2004 | Kay et al. |
| 6,859,899 B2 | 2/2005 | Shalvi et al. |
| 6,862,270 B1 | 3/2005 | Ho |
| 6,877,043 B2 | 4/2005 | Mallory et al. |
| 6,877,166 B1 | 4/2005 | Roeck et al. |
| 6,898,210 B1 | 5/2005 | Cheng et al. |
| 6,930,989 B1 | 8/2005 | Jones, IV et al. |
| 6,940,833 B2 | 9/2005 | Jonas et al. |
| 6,950,399 B1 | 9/2005 | Bushmitch et al. |
| 6,961,314 B1 | 11/2005 | Quigley et al. |
| 6,985,437 B1 | 1/2006 | Vogel |
| 6,996,198 B2 | 2/2006 | Cvetkovic |
| 7,035,270 B2 | 4/2006 | Moore, Jr. et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,142,553 B1 | 11/2006 | Ojard et al. |
| 7,146,632 B2 | 12/2006 | Miller |
| 7,149,220 B2 | 12/2006 | Beukema et al. |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,372,853 B2 | 5/2008 | Sharma et al. |
| 7,460,543 B2 | 12/2008 | Malik et al. |
| 7,487,532 B2 | 2/2009 | Robertson et al. |
| 7,532,642 B1 | 5/2009 | Peacock |
| 7,532,693 B1 | 5/2009 | Narasimhan |
| 7,555,064 B2 | 6/2009 | Beadle |
| 7,574,615 B2 | 8/2009 | Weng et al. |
| 7,606,256 B2 | 10/2009 | Vitebsky et al. |
| 7,652,527 B2 | 1/2010 | Ido et al. |
| 7,653,164 B2 | 1/2010 | Lin et al. |
| 7,664,065 B2 | 2/2010 | Lu |
| 7,675,970 B2 | 3/2010 | Nemiroff et al. |
| 7,697,522 B2 | 4/2010 | Kliger et al. |
| 7,742,495 B2 | 6/2010 | Kliger et al. |
| 7,782,850 B2 | 8/2010 | Kliger et al. |
| 7,783,259 B2 | 8/2010 | Dessert et al. |
| 7,817,642 B2 | 10/2010 | Ma et al. |
| 7,860,092 B2 | 12/2010 | Yoon et al. |
| 7,916,756 B2 | 3/2011 | Atsumi et al. |
| 8,090,043 B2 | 1/2012 | Levi et al. |
| 8,098,770 B2 | 1/2012 | Shusterman |
| 8,184,550 B2 | 5/2012 | Beck et al. |
| 2001/0039660 A1 | 11/2001 | Vasilevsky et al. |
| 2002/0010562 A1 | 1/2002 | Schleiss et al. |
| 2002/0059623 A1 | 5/2002 | Rodriguez et al. |
| 2002/0059634 A1 | 5/2002 | Terry et al. |
| 2002/0069417 A1 | 6/2002 | Kliger et al. |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0105970 A1 | 8/2002 | Shvodian |
| 2002/0136231 A1 | 9/2002 | Leatherbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0022683 A1 | 1/2003 | Beckmann et al. |
| 2003/0060207 A1 | 3/2003 | Sugaya et al. |
| 2003/0063563 A1 | 4/2003 | Kowalski |
| 2003/0066082 A1 | 4/2003 | Kliger et al. |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0004934 A1 | 1/2004 | Zhu et al. |
| 2004/0037366 A1 | 2/2004 | Crawford |
| 2004/0047284 A1 | 3/2004 | Eidson |
| 2004/0107445 A1 | 6/2004 | Amit |
| 2004/0163120 A1 | 8/2004 | Rabenko et al. |
| 2004/0172658 A1 | 9/2004 | Rakib et al. |
| 2004/0177381 A1 | 9/2004 | Kliger et al. |
| 2004/0224715 A1 | 11/2004 | Rosenlof et al. |
| 2004/0258062 A1 | 12/2004 | Narvaez |
| 2005/0015703 A1 | 1/2005 | Terry et al. |
| 2005/0097196 A1 | 5/2005 | Wronski et al. |
| 2005/0152350 A1 | 7/2005 | Sung et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0059400 A1 | 3/2006 | Clark et al. |
| 2006/0062250 A1 | 3/2006 | Payne, III |
| 2006/0078001 A1 | 4/2006 | Chandra et al. |
| 2006/0104201 A1 | 5/2006 | Sundberg et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |

(56) References Cited

U.S. PATENT DOCUMENTS

| | | |
|---|---|---|
| 2007/0025317 A1 | 2/2007 | Bolinth et al. |
| 2007/0040947 A1 | 2/2007 | Koga |
| 2007/0127373 A1 | 6/2007 | Ho et al. |
| 2007/0160213 A1 | 7/2007 | Un et al. |
| 2007/0171919 A1 | 7/2007 | Godman et al. |
| 2007/0183786 A1 | 8/2007 | Hinosugi et al. |
| 2007/0206551 A1 | 9/2007 | Moorti et al. |
| 2007/0217436 A1 | 9/2007 | Markley et al. |
| 2007/0253379 A1 | 11/2007 | Kumar et al. |
| 2007/0286121 A1 | 12/2007 | Kolakowski et al. |
| 2008/0037487 A1 | 2/2008 | Li et al. |
| 2008/0037589 A1 | 2/2008 | Kliger et al. |
| 2008/0080369 A1 | 4/2008 | Sumioka et al. |
| 2008/0089268 A1 | 4/2008 | Kinder et al. |
| 2008/0178229 A1 | 7/2008 | Kliger et al. |
| 2008/0189431 A1 | 8/2008 | Hyslop et al. |
| 2008/0212591 A1 | 9/2008 | Wu et al. |
| 2008/0225832 A1 | 9/2008 | Kaplan et al. |
| 2008/0238016 A1 | 10/2008 | Chen et al. |
| 2008/0271094 A1 | 10/2008 | Kliger et al. |
| 2008/0273591 A1 | 11/2008 | Brooks et al. |
| 2008/0279219 A1 | 11/2008 | Wu et al. |
| 2008/0298241 A1 | 12/2008 | Ohana et al. |
| 2009/0063878 A1 | 3/2009 | Schmidt et al. |
| 2009/0092154 A1 | 4/2009 | Malik et al. |
| 2009/0106801 A1 | 4/2009 | Horii |
| 2009/0122901 A1 | 5/2009 | Choi et al. |
| 2009/0165070 A1 | 6/2009 | McMullin et al. |
| 2009/0217325 A1 | 8/2009 | Kliger et al. |
| 2009/0252172 A1 | 10/2009 | Hare |
| 2009/0254794 A1 | 10/2009 | Malik et al. |
| 2009/0257483 A1 | 10/2009 | French et al. |
| 2009/0285212 A1 | 11/2009 | Chu et al. |
| 2009/0296578 A1 | 12/2009 | Bernard et al. |
| 2009/0316589 A1 | 12/2009 | Shafeeu |
| 2010/0031297 A1 | 2/2010 | Klein et al. |
| 2010/0080312 A1 | 4/2010 | Moffatt et al. |
| 2010/0150016 A1 | 6/2010 | Barr |
| 2010/0158013 A1 | 6/2010 | Kliger et al. |
| 2010/0158015 A1 | 6/2010 | Wu |
| 2010/0158021 A1* | 6/2010 | Kliger et al. .................. 370/400 |
| 2010/0158022 A1 | 6/2010 | Kliger et al. |
| 2010/0162329 A1 | 6/2010 | Ford et al. |
| 2010/0174824 A1 | 7/2010 | Aloni et al. |
| 2010/0185731 A1 | 7/2010 | Wu |
| 2010/0185759 A1 | 7/2010 | Wu |
| 2010/0214916 A1* | 8/2010 | Wu et al. ........................ 370/230 |
| 2010/0238932 A1 | 9/2010 | Kliger et al. |
| 2010/0246586 A1 | 9/2010 | Ohana et al. |
| 2010/0254278 A1 | 10/2010 | Kliger et al. |
| 2010/0254402 A1 | 10/2010 | Kliger et al. |
| 2010/0281195 A1 | 11/2010 | Daniel et al. |
| 2010/0284474 A1 | 11/2010 | Kliger et al. |
| 2010/0290461 A1 | 11/2010 | Kliger et al. |
| 2010/0322134 A1 | 12/2010 | Wu |
| 2011/0001833 A1 | 1/2011 | Grinkemeyer et al. |
| 2011/0013633 A1 | 1/2011 | Klein et al. |
| 2011/0080850 A1 | 4/2011 | Klein et al. |
| 2011/0205891 A1* | 8/2011 | Kliger et al. .................. 370/230 |
| 2011/0206042 A1 | 8/2011 | Tarrab et al. |
| 2011/0310907 A1 | 12/2011 | Klein et al. |

FOREIGN PATENT DOCUMENTS

| | | |
|---|---|---|
| EP | 0 385695 | 9/1990 |
| EP | 0 622926 | 11/1994 |
| EP | 1501326 | 1/2005 |
| JP | 60160231 | 8/1985 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27254 dated Feb. 3, 2004 (5 pgs).

"MoCA: Ubiquitous Multimedia Networking in the Home, Proc of SPIE vol. 6776 67760C-1", Shlomo Ovadia, SPIE, Bellingham, WA, May 28, 2010.

"MoCA Brewing Up Bigger Bandwidth, CTO Anton Monk Outlines Plans for MoCA 2.0 Home-Networking Specification" (http://www.multichannel.com/article/160878-MoCa_Brewing_Up_bigger_Bandwidth.php), Multichannel News, New York, NY, Dec. 15, 2008.

"Home Networking on Coax for Video and Multimedia, Overview for IEEE 802.1AVB", Shlomo Ovadia, San Ramon/California, May 30, 2007.

"Microtune Introduces Industry's First 1-GHZ Cable Tuners Compatible with MoCA—Home Networking Standard", Business Wire, San Francisco, California, Mar. 19, 2007.

* cited by examiner

METHOD AND APPARATUS FOR POLICING A QOS FLOW IN A MOCA 2.0 NETWORK

CROSS-REFERENCED TO RELATED APPLICATIONS

This application is a non-provisional of U.S. Provisional Patent No. 61/306,623, filed Feb. 22, 2010, entitled "PQoS Policing Support for MoCA 2.0" of which is incorporated by reference herein in its entirety.

FIELD OF TECHNOLOGY

The present invention relates generally to managing bandwidth of a network. For the purposes of this application, bandwidth of a network may be understood to refer to the amount of information sent over data flows in the network. Specifically, managing relates to policing i.e., controlling—the use of at least one Quality of Service (QoS) flow in a network where the at least one QoS flow may have priority over other flows.

BACKGROUND

Home network technologies using coax are known generally. The Multimedia over Coax Alliance (MoCA™), at its website mocalliance.org, provides an example of a suitable specification (MoCA 2.0) for networking of digital video and entertainment through existing coaxial cable in the home which has been distributed to an open membership. The MoCA 2.0 specification is incorporated by reference herein in its entirety.

Home networking over coax taps into the vast amounts of unused bandwidth available on the in-home coax. More than 70% of homes in the United States have coax already installed in the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming, organized as data flows, with high Quality of Service. A QoS flow may have parameters governing the network that must be met to obtain the required QoS. Therefore the MoCA specification gives priority to requests by a QoS flow for network resources. The priority given to a QoS flow permits abuse of the network by the QoS flow.

In one or more implementations, it would be desirable to provide a policing mechanism to police the use of bandwidth in a MoCA network by a QoS flow.

SUMMARY

A system and/or method provides, for example, a policing mechanism to control the use of bandwidth in a MoCA network by a QoS flow, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
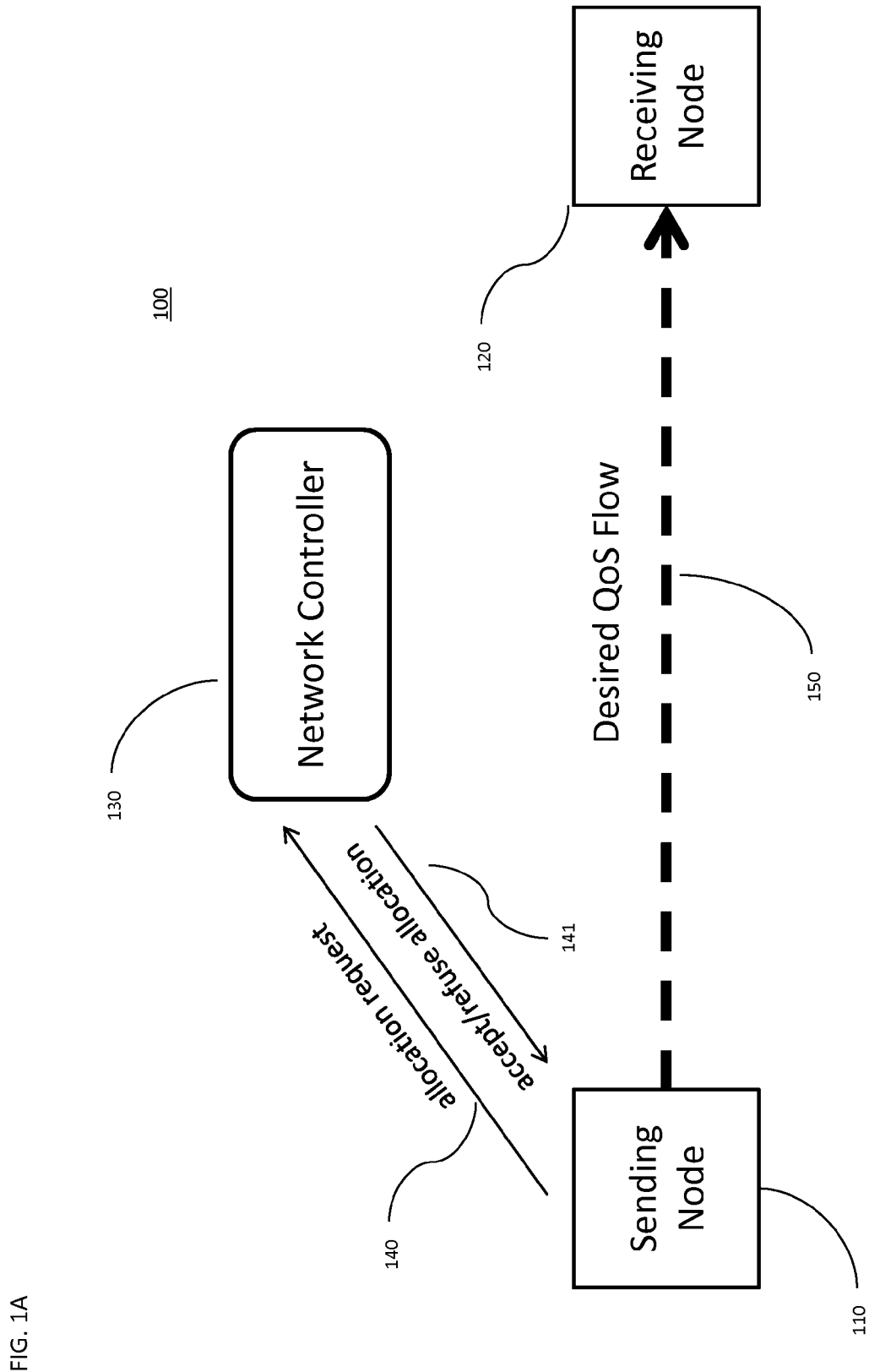
FIG. 1A shows a schematic diagram of an exemplary embodiment of messages exchanged during a request for the allocation of a QoS flow.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash technology and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

Certain services implemented over the MoCA network may require the MoCA network to provide a data flow that has reserved bandwidth and special access to bandwidth. Such a flow may more specifically be termed a Parameterized QoS ("PQoS") flow. A PQoS flow will receive guaranteed bandwidth from a network, preferably from a network controller—i.e., an RR on behalf of a QoS flow will have priority over some other flows.

Nodes in a MoCA network acquire bandwidth by making a Reservation Request (RR). Multiple Reservation Requests may be made by a single node depending on bandwidth needs of a flow sourced by that node. The reservation requests may be made by a node to a network controller which may grant the request. An RR is granted when it has sufficient priority over other requests. In the alternative a node may reserve bandwidth by making an Opportunistic Reservation Request (ORR). An ORR for a PQoS is granted by the network controller when bandwidth is readily available—e.g., the bandwidth would be unused if not consumed by the ORR, and all PQoS related RRs have already been granted. An ORR may have lower priority than some other requests.

The guaranteed treatment of the PQoS may be abused leading to difficulties for other flows in the network. An example of abuse may be shown when a first QoS flow is established and a second QoS flow is then established. The second flow may actually request more bandwidth then guaranteed to it by the network controller. In such circumstances, a suitable QoS for the first flow, which was also previously guaranteed bandwidth, cannot be maintained.

Control or policing of QoS flow requests may be performed by the network controller, but this method has disadvantages—the network controller must be able to balance potentially abusive requests from one node against requests from another node. Another approach relies on each node policing its own ingress flows. An ingress flow is defined as a flow that is an ingress or an input to the network—i.e., a flow from a node that is the source of data.

It should be noted that the term packet is used throughout the description. Packets may be understood to refer to a MoCA term; MAC Service Data Unit (MSDU).

FIG. 1A shows an exemplary network 100 comprising a sending node 110, a receiving node 120 and a network controller 130. The sending node 110 may also be called an ingress node. The sending node 110 may seek to establish a QoS flow through the connection 150 between itself and receiving node 120. The sending node 110 may send a request for allocation 140 to network controller 130. The request for allocation 140 may comprise a list of requirements for a QoS flow. Network controller 130 sends a response 141 to the sending node. The response may be positive—i.e., the allocation is reserved—or the response may be negative.

Although the example network 100 shows a single sending node and a single receiving node, other configurations are contemplated and included within the scope of the invention. Alternative embodiments may include multiple sending nodes, multiple receiving nodes and multiple nodes that can both send and receive. Any of these configurations may share network resources. Although a single network controller is shown other configurations—e.g., multiple network controllers—are contemplated and included within the scope of the invention. Any suitable combination of sending nodes, receiving nodes, transceiving nodes and network controllers are contemplated and included within the scope of the invention.

Figure 1B:
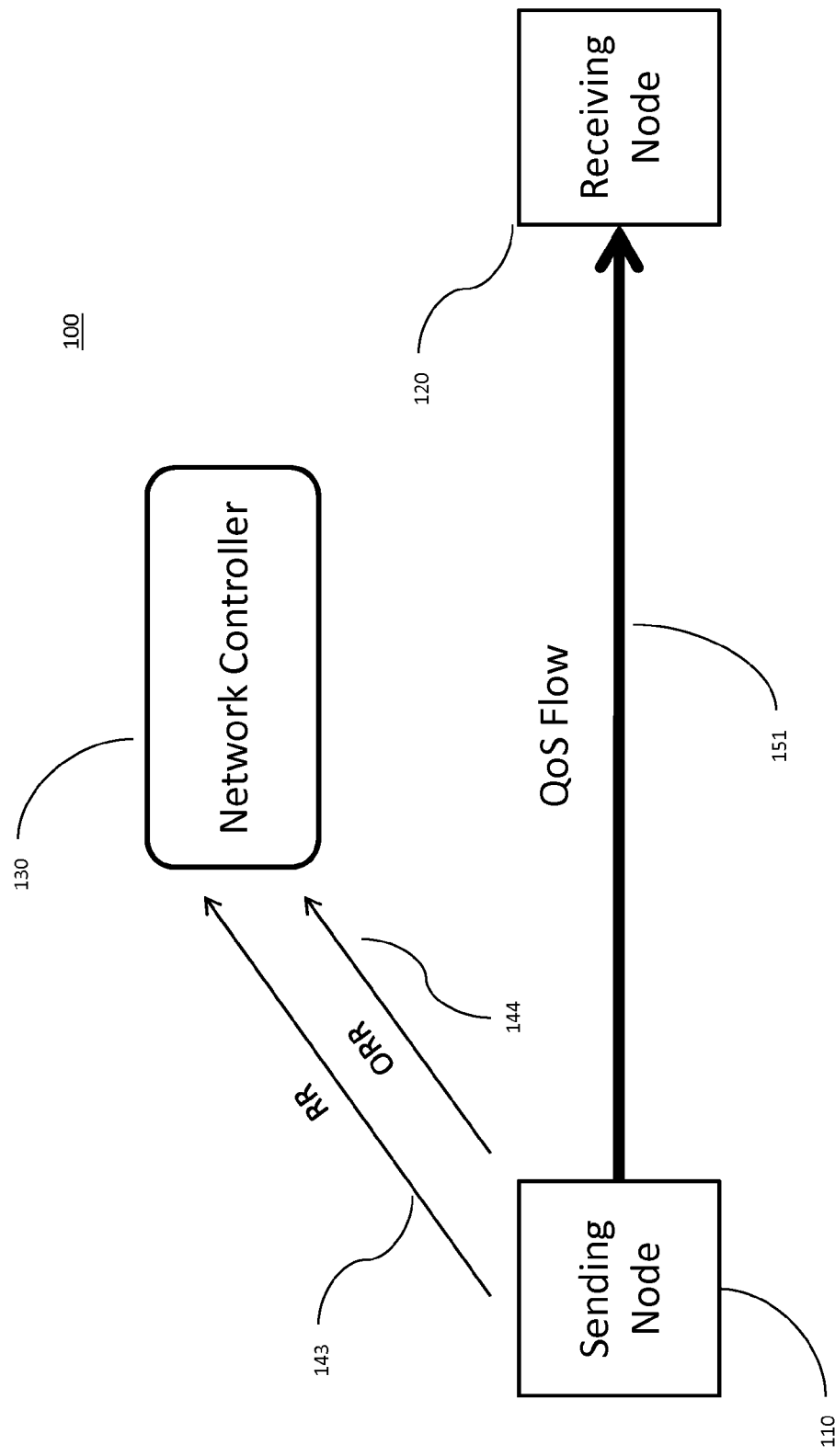
FIG. 1B shows a schematic diagram of an exemplary embodiment of messages exchanged during a request for bandwidth.

FIG. 1B shows an exemplary network 100 comprising a sending node 110, a receiving node 120 and a network controller 130. The QoS flow 151 is established between sending node 110 and receiving node 130. The QoS flow may be the result of a positive response 141 to an allocation request 140.

Each time bandwidth is required for QoS flow 151, the sending node 110 sends a RR 143 to the network controller 130. Priority will be given to these requests over some other requests. In an embodiment of the invention described below, the sending node 110 is self policing and limits the number of RRs sent in a particular time period. If additional bandwidth is required, the sending node 110 will make an ORR 144 to network controller 130. As described above, the network controller will give less priority to an ORR than a RR thereby maintaining a suitable level of service for all flows in the network.

Although only a single RR and a single ORR are shown, the diagram merely illustrates exemplary requests. Multiple RR and multiple ORR are contemplated and included within the scope of the invention.

Figure 2:
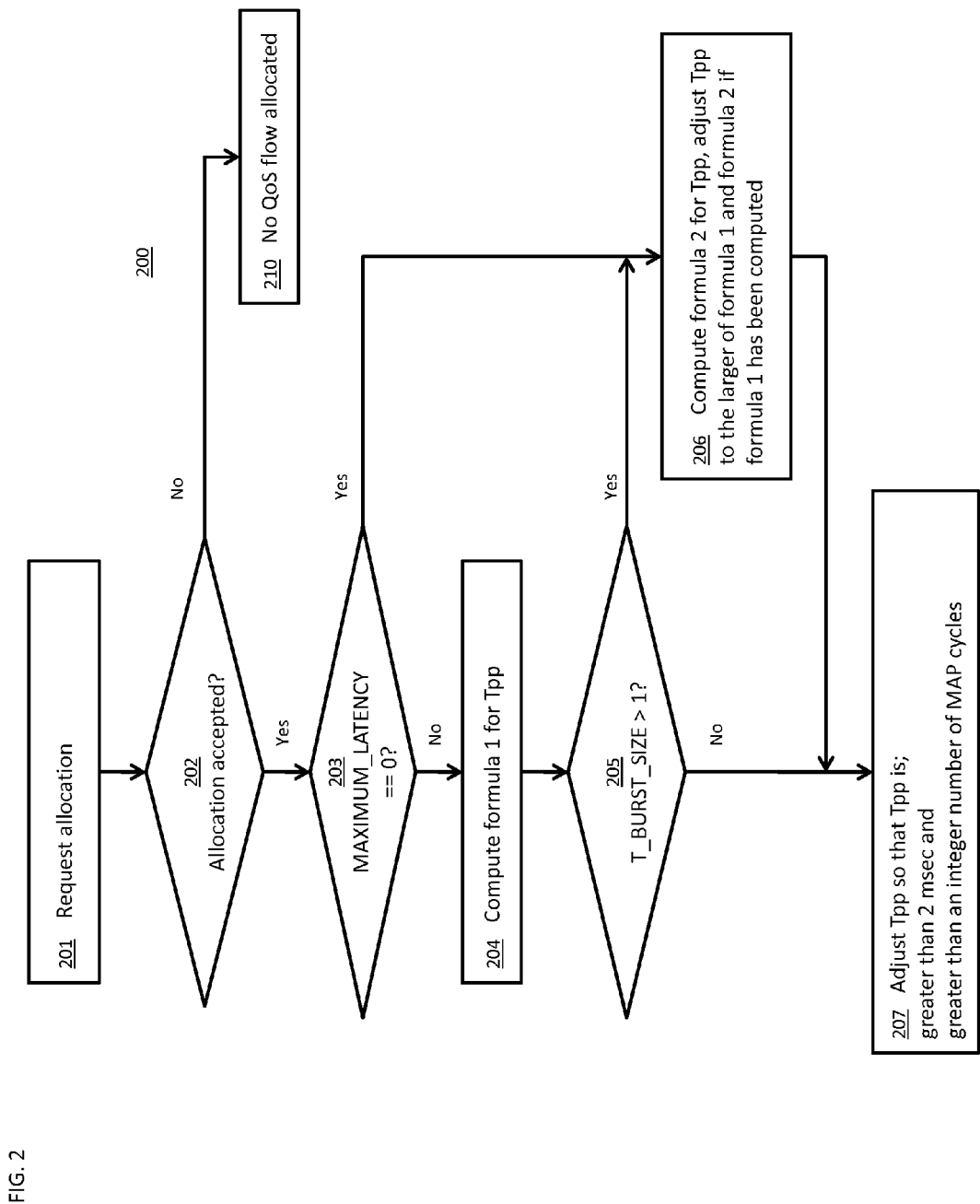
FIG. 2 is a flow chart for calculating a policing window size.

Policing of the output of a sending node 110 is performed by regulating both the number of packets and the number of bits in a particular time window. FIG. 2 shows an illustrative policing window algorithm 200 for computing a suitable policing time period (Tpp).

At step 201 an allocation request 140 is made for a QoS flow. At step 202 the allocation response 141 is received; if the response is not accepted, then a QoS flow is not allocated at step 210. If the allocation is accepted then a calculation is made for the policing parameters according to the Traffic SPECification (TSPEC) of the QoS flow 151.

If the MAXIMUM_LATENCY is specified at step 203 i.e., max latency is equal to the time of a beginning of a burst arriving at the Ethernet Convergence Layer ("ECL") to a beginning of the next burst arriving at the ECL, then Tpp may be computed via a first formula at step 204 as shown here.

P=floor[MAXIMUM_LATENCY*(T_PEAK_DATA_RATE/(T_PACKET_SIZE*8))], where floor is made with respect to the minimum duration to transmit an integer number of packets.

P=max (P,1), P cannot be smaller than 1 millisecond

Tpp=P*T_PACKET_SIZE*8/T_PEAK_DATA_RATE

If the MAXIMUM_LATENCY is not specified at step 203, then Tpp may be computed via a second formula at step 206 shown here. A latency of a packet is understood to refer to a period of time that begins at the time an Ethernet packet arrives at an Ingress Node until the time that it arrives at the Ethernet port of the Egress node. An ingress node is the MoCA node that transmits the packet; the Egress node is the MoCA node that receives the packet. The maximum latency of the flow is the largest allowed latency of packets of that flow. Accordingly, for the purposes of this application, MAXIMUM_LATENCY may be understood to refer to the maximum allowable latency of a flow of data with regard to a packet.

T_BURST_SIZE*T_PACKET_SIZE*8/T_PEAK_DATA_RATE.

Each of the parameters in the formulas are established by the TSPEC for the QoS flow 151. The TSPEC is set by the allocation request 140. T_BURST_SIZE may be the maximum number of consecutive packets. T_PACKET_SIZE—e.g., the standard size of a packet—may be characterized in bytes. T_PEAK_DATA_RATE may be the maximum data rate for the network in bits per second. Multiplying the packet size in by 8 converts from bytes to bits and yields a time for Tpp. Typical times are in milliseconds as shown in the table below.

| MAX_LATENCY | T_BURST_SIZE | PEAK_DATA_RATE (Mbps) | PACKET_SIZE (Bytes) | Tpp (mSec) | Packet Credit | Bit Credit |
|---|---|---|---|---|---|---|
| 0 | 10 | 10 | 1518 | 12.14 | 10 | 121440 |
| 12 | 4 | 10 | 1518 | 10.93 | 9 | 109296 |
| 0 | 1 | 5 | 1518 | 2.43 | 1 | 12144 |
| 25 | 1 | 5 | 1518 | 2.43 | 1 | 12144 |
| 0 | 8 | 20 | 1518 | 4.86 | 8 | 97152 |
| 5 | 8 | 20 | 1518 | 4.86 | 8 | 97152 |

After the first formula is computed at step 204, a check is made for the T_BURST_SIZE value at step 205. If the T_BURST_SIZE is greater than 1, then Tpp may be computed again via the second formula at step 206. The larger of the two Tpp computations may be used as the final Tpp.

An adjustment for Tpp can be made at step 207. At step 207 Tpp is adjusted so that it is preferably equal to or larger than 2 milliseconds and rounds to the time of an integer number of packets arriving at the ECL.

Once a Tpp is established, a bound for the usage of the network 100 is established. An allocation, or credit, may be set for credit parameters. The credit parameters may include the number of packets and the number of bits that can be sent in one Tpp and may be computed as follows.

PacketCredit=T_BURST_SIZE
BitCredit=PacketCredit*T_PACKET_SIZE*8

Figure 3:
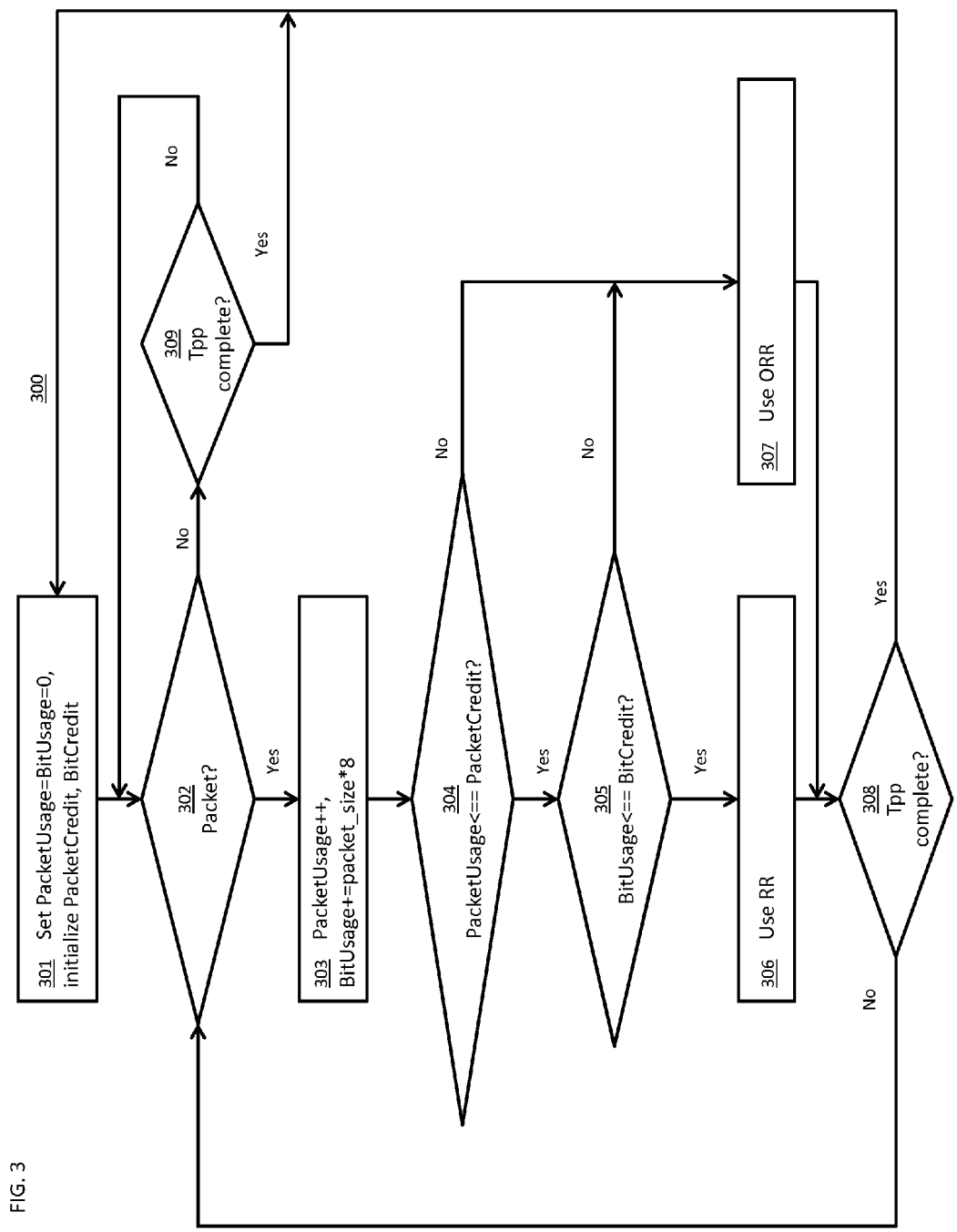
FIG. 3 is a flow chart for the policing of a QoS flow.

FIG. 3 shows an illustrative policing algorithm 300 for regulating the amount of data sent in one Tpp. The policing algorithm 300 is preferably executed for each Tpp so long as the QoS flow 151 is operational. At step 301 usage parameters may be initialized. The usage parameters may include PacketUsage and BitUsage. The variables PacketUsage and BitUsage may be initialized to zero. Also in step 301, the variables PacketCredit and BitCredit may be initialized according to the formula shown above. The variables PacketCredit and BitCredit may be initialized prior to the execution of policing algorithm 300.

At step 302 the policing algorithm 300 waits for a packet to be available for sending by the sending node 110. If a packet is not available then a check is made at step 309 to see if the Tpp has expired. If Tpp has not expired that the policing algorithm 300 returns to step 302. If the Tpp has expired than the policing algorithm 300 begins again at step 301. If a packet arrives then step 303 accumulates the usage by the QoS flow in the variables PacketUsage and BitUsage as follows.

PacketUsage=PacketUsage+1
BitUsage=BitUsage+(packet_size*8)

At step 304 a check is made to see if the allocation for PacketUsage has been exceeded. At step 305 a check is made to see if the allocation for BitUsage has been exceeded. If either allocation has been exceeded, an ORR 144 is sent to the network controller 130 by the sending node 110 to reserve bandwidth opportunistically at step 307. If neither allocation has been exceeded, an RR is sent to the network controller 130 by the sending node 110 to reserve bandwidth with QoS priority at step 306.

After the execution of step 306 or step 307, a check is made at step 308 to see if the Tpp has expired. If the Tpp has not expired, then the policing algorithm 300 returns to step 302. If the Tpp has expired, then the policing algorithm 300 begins again at step 301.

Although the network and methods of the invention are shown with regards to a MoCA 2.0 network, the same system and methods could be applied to other suitable networks. Some modification may be required to match the essential methods to the new network but these will be obvious to those of normal skill in the art.

Thus, systems and methods for policing a MoCA QoS flow have been provided.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A method of policing bandwidth usage in a home network, the network comprising a sending node, a receiving node and a network controller, wherein the sending node is connected to the receiving node, the method comprising:
   computing a policing window;
   computing a credit parameter;
   initializing a usage parameter at the beginning of the policing window;
   updating the usage parameter during the policing window;
   sending a reservation request when the usage parameter is less than or equal to the credit parameter, wherein the reservation request is sent by the sending node to the network controller; and
   sending an opportunistic reservation request when the usage parameter is greater than the credit parameter, wherein the opportunistic reservation request is sent by the sending node to the network controller.

2. The method of claim 1, further comprising:
   requesting from the network controller an allocation of a flow by the sending node; and
   using the network controller to determine whether to refuse the allocation or to grant the allocation.

3. The method of claim 1, wherein computing the policing window comprises:
   determining whether a first flow parameter is set to a first particular value;
   computing the policing window according to a first formula when the first flow parameter is not equal to the first particular value; and
   computing the policing window according to a second formula when the first flow parameter is equal to the first particular value.

4. The method of claim 3, wherein computing the policing window further comprises:
   determining whether a second flow parameter is greater than a second particular value when the policing window is computed according to the first formula;
   maintaining the policing window, which is computed according to the first formula, when the second flow parameter is not greater than the second particular value; and
   changing the policing window, which is computed according to the first formula, by computing it according to the second formula when (a) the second flow parameter is greater than the second particular value and (b) the policing window computed according to the second formula is greater than the policing window computed according to the first formula.

5. The method of claim 3, wherein the first formula is given by $P*S/R$, where

P is based on a minimum duration to transmit, by the sending node to the receiving node, an integer number of packets,
   S is a size of each of the packets, and
   R is a peak data rate of the network.

6. The method of claim 5, wherein P is the floor of a ratio of a maximum latency of a flow of the packets to a time to transmit one of the packets, and wherein P is greater than or equal to 1.

7. The method of claim 3, wherein the second formula is given by $B*S/R$, where

B is a maximum number of consecutive packets to be transmitted by the sending node to the receiving node,
S is a size of each of the packets, and
R is a peak data rate of the network.

8. The method of claim 1, wherein computing the policing window further comprises adjusting the policing window to be greater than 2 milliseconds.

9. The method of claim 1, wherein computing the policing window further comprises adjusting the policing window to be greater than an integer number of Media Access Plan cycles.

10. The method of claim 1, wherein the credit parameter comprises the number of packets that can be sent within the policing window.

11. The method of claim 1, wherein the credit parameter comprises the number of bits that can be sent within the policing window.

12. The method of claim 1, wherein computing the policing window further comprises initializing the credit parameter.

13. The method of claim 1, wherein the usage parameter is updated when one of a reservation request or an opportunistic reservation request is sent.

14. The method of claim 1, further comprising reinitializing the credit parameter and the usage parameter when the policing window is complete.

15. A network comprising:
a sending node connected to a receiving node; and
a network controller;
wherein the sending node is configured to establish a flow to the receiving node,
wherein the sending node is configured to send a reservation request to the network controller when a usage parameter is less than or equal to a credit parameter and to send an opportunistic reservation request to the network controller when the usage parameter has exceeded the credit parameter.

16. The network of claim 15, wherein the flow is a parameterized quality of service flow.

17. The network of claim 15, wherein the sending node is configured to compute a policing window and to update a usage parameter within the policing window.

18. The network of claim 17, wherein computing the policing window comprises:
determining whether a first flow parameter is set to a first particular value;
computing the policing window according to a first formula when the first flow parameter is not equal to the first particular value; and
computing the policing window according to a second formula when the first flow parameter is equal to the first particular value.

19. The network of claim 18, wherein computing the policing window further comprises:
determining whether a second flow parameter is greater than a second particular value when the policing window is computed according to the first formula;
maintaining the policing window, which is computed according to the first formula, when the second flow parameter is not greater than the second particular value; and
changing the policing window, which is computed according to the first formula, by computing it according to the second formula when (a) the second flow parameter is greater than the second particular value and (b) the policing window computed according to the second formula is greater than the policing window computed according to the first formula.

20. The network of claim 17, wherein computing the policing window further comprises adjusting the policing window to be greater than 2 milliseconds.

21. The network of claim 17, wherein computing the policing window comprises adjusting the policing window to be greater than an integer number of Media Access Plan cycles.

22. The network of claim 17, wherein the credit parameter comprises the number of packets that can be sent within the policing window.

23. The network of claim 17, wherein the credit parameter comprises the number of bits that can be sent within the policing window.

24. The network of claim 17, wherein computing the policing window further comprises initializing the credit parameter.

25. The network of claim 24, wherein computing the policing window further comprises initializing the usage parameter.

26. The network of claim 25, wherein the usage parameter is updated when one of a reservation request or an opportunistic reservation request is sent.

27. The network of claim 25, wherein the sending node is configured to reinitialize the credit parameter and the usage parameter when the policing window is complete.

28. The network of claim 15, wherein the sending node is configured to request an allocation of a flow from the network controller, and wherein the network controller is configured to determine whether to refuse the allocation or to grant the allocation.

29. A method of policing bandwidth usage in a home network, the network comprising a sending node, a receiving node and a network controller, wherein the sending node is connected to the receiving node, the method comprising:
computing a policing window;
computing a credit parameter;
initializing a usage parameter at the beginning of the policing window;
updating the usage parameter during the policing window;
requesting bandwidth that was granted to a data flow when the usage parameter is less than or equal to the credit parameter, wherein the bandwidth is requested by the sending node from the network controller; and
sending an opportunistic reservation request when the usage parameter is greater than the credit parameter, wherein the opportunistic reservation request is sent by the sending node to the network controller.

30. The method of claim 29, wherein the network controller is configured to grant the opportunistic reservation request when sufficient bandwidth exists on the network.

* * * * *